United States Patent [19]
White et al.

[11] Patent Number: 5,925,590
[45] Date of Patent: Jul. 20, 1999

[54] CATALYSTS UTILIZING OXYGEN-DEFICIENT METAL OXIDE COMPOUND FOR REMOVAL OF EXHAUST GAS CONSTITUENTS

[75] Inventors: James H. White; Michael Schwartz, both of Boulder, Colo.

[73] Assignee: Eltron Research, Inc., Boulder, Colo.

[21] Appl. No.: 08/960,876

[22] Filed: Oct. 30, 1997

Related U.S. Application Data

[63] Continuation of application No. 08/248,809, May 25, 1994, abandoned.

[51] Int. Cl.$^6$ ............................. B01J 23/10; B01J 23/02; B01J 23/38
[52] U.S. Cl. ..................... 502/302; 502/303; 502/304; 502/311; 502/317; 502/322; 502/330; 502/332; 502/333; 502/344; 502/348; 502/351; 502/353; 502/354
[58] Field of Search .................... 502/302, 303, 502/304, 305, 308, 311, 317, 318, 322, 325, 326, 327, 330, 332, 333, 331, 344, 346, 348, 351, 353, 354, 355

[56] References Cited

U.S. PATENT DOCUMENTS

| | | |
|---|---|---|
| 4,127,510 | 11/1978 | Harrison et al. . |
| 4,438,082 | 3/1984 | Dettling et al. . |
| 4,469,816 | 9/1984 | Armor et al. . |
| 4,587,231 | 5/1986 | Sawamura et al. . |
| 4,760,044 | 7/1988 | Joy, III et al. . |
| 4,791,091 | 12/1988 | Bricker et al. . |
| 4,808,564 | 2/1989 | Matsumoto et al. ............ 502/303 |
| 4,868,149 | 9/1989 | Bricker . |
| 4,919,902 | 4/1990 | Bricker et al. . |
| 4,923,842 | 5/1990 | Summers . |
| 4,960,574 | 10/1990 | Bricker . |
| 5,015,616 | 5/1991 | Sekido et al. . |
| 5,041,407 | 8/1991 | Williamson et al. . |
| 5,051,394 | 9/1991 | Haruta et al. . |
| 5,057,482 | 10/1991 | Fukuda et al. . |
| 5,116,800 | 5/1992 | Williamson et al. . |
| 5,139,991 | 8/1992 | Taylor et al. . |
| 5,185,305 | 2/1993 | Subramanian et al. . |
| 5,206,196 | 4/1993 | Nakano et al. . |
| 5,208,198 | 5/1993 | Nakano et al. . |
| 5,213,781 | 5/1993 | Abe et al. . |
| 5,227,145 | 7/1993 | Kintaichi et al. . |
| 5,229,079 | 7/1993 | Harada et al. . |
| 5,234,881 | 8/1993 | Narula et al. . |
| 5,236,879 | 8/1993 | Inoue et al. . |
| 5,238,890 | 8/1993 | Hayasaka et al. . |
| 5,248,650 | 9/1993 | Sekiba et al. . |
| 5,254,322 | 10/1993 | Bhore et al. . |
| 5,254,515 | 10/1993 | Imai . |
| 5,256,614 | 10/1993 | Itoh et al. . |
| 5,384,301 | 1/1995 | Flytzani-Stephanopoulos et al. ............ 502/304 |
| 5,500,198 | 3/1996 | Liu et al. ........................ 423/246 |

OTHER PUBLICATIONS

Muraki et al. (1986), "Palladium–Lanthanum Catalysts for Automotive Emission Control," Ind. Eng. Chem. Prod. Res. Dev., 25, 202.

Adams et al. (1983), "Palladium–Tungsten Catalysts for Automotive Exhaust Treatment," Ind. Eng. Chem. Prod. Res. Dev., 22, 207.

Beck et al, (1993) SAE Paper No. 930084, "The Performance of Pd, Pt, and Pd–Pt Catalysts in Lean Exhaust," General Motors Research.

*Primary Examiner*—Bekir L. Yildirim
*Attorney, Agent, or Firm*—Greenlee, Winner & Sullivan, P.C.

[57] ABSTRACT

The invention provides various solid catalysts for decomposition of exhaust gases. Catalysts include, among others, those of formula $Ce_{0.5}La_{0.4}Sr_{0.1}Pd_{0.025}O_{3x}$ and $BiCo_{0.8}Cu_{0.2}O_{3x}$. The invention also relates to catalytic reactors for decomposition of exhaust gases utilizing solid catalysts of the invention. The invention further provides methods for synthesis of various mixed metal oxide catalysts for decomposition of exhaust gas pollutants.

28 Claims, 3 Drawing Sheets

○ A   ○ O   ● M   ⊘ M^n+

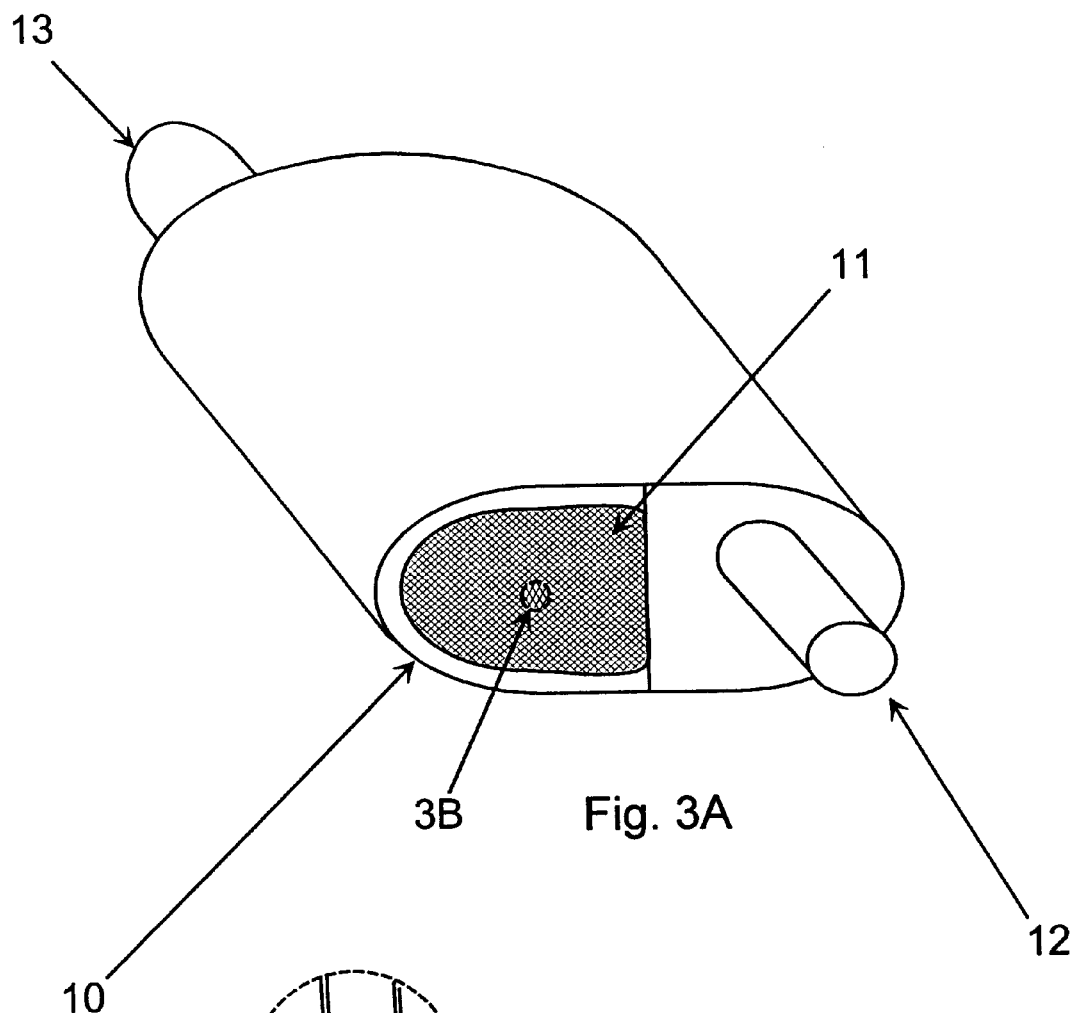
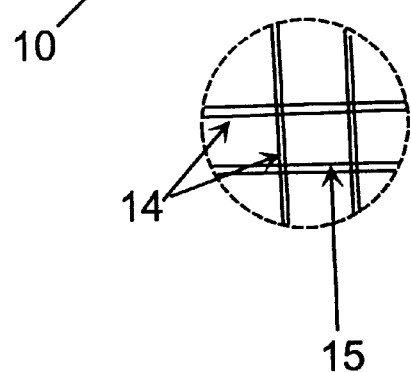
Fig. 3A
Fig. 3B

CATALYSTS UTILIZING OXYGEN-DEFICIENT METAL OXIDE COMPOUND FOR REMOVAL OF EXHAUST GAS CONSTITUENTS

This a continuation of application Ser. No. 08/248,809, filed on May 25, 1994, now abandoned.

This invention was made with Government support under grant number 111-9200988 awarded by the National Science Foundation. The Government has certain rights in this invention.

TECHNICAL FIELD

This invention relates to the removal of pollutants from exhaust streams using catalysts based on oxygen deficient (including defect fluorite and pyrochlore) crystallographic phases formed by simultaneous reaction of the catalyst components suitable for the individual or simultaneous decomposition of exhaust constituents. More particularly, preparation of the catalysts involves simultaneous formation of the catalytically active component and the surrounding metal oxide lattice (carrier).

BACKGROUND ART

Catalysts for decomposition of exhaust gas constituents have been studied and used previously. The catalysts of the present invention would be useful in automobile catalytic converters, and would be required and expected to reach corresponding regulatory requirements. These materials, involving simultaneous formation of the catalytically active component and the surrounding metal oxide lattice, will offer improved performance at lower costs for exhaust pollutant removal, as compared to mixtures of their components as found in currently used catalysts.

Catalysts currently used in converters for exhaust gas pollutant removal utilize combinations of platinum and rhodium supported on aluminum oxide. Such catalysts can remove over 90% of evolved exhaust gas pollutants. However, the cost of such catalysts is an undesirable feature: a monolith (a supporting ceramic or metal structure) for a typical catalytic converter may contain $30–40 worth of precious metals. In contrast, the catalysts of the present invention may possess efficiencies, usually expressed in terms of "cost-based activities" (pollutant removal rate divided by total cost of active catalyst metal) of between 1 and 100 times those of currently used catalysts.

Several requirements exist for pollutant mitigation catalysts. The first is that they be capable of adsorbing the reactant (pollutant) to be removed while simultaneously weakening the bonds between the constituents of the pollutant molecule. This may involve several chemical features. For example, the ability to form bonds to hydrogen (from decomposition of hydrocarbons), carbon monoxide, and nitrogen oxides are all requirements of the catalyst, since formation of these bonds results in rupture of bonds in pollutant molecules and easier decomposition (of nitrogen oxides or hydrocarbons) or oxidation of the molecules (carbon monoxide or hydrocarbons).

The second requirement is that reactions between adsorbed hydrocarbon and carbon monoxide reactants and adsorbed oxygen occur. This combustion process permits the pollutant species to be readily removed from the catalyst surface to provide for a renewal of available catalyst sites. This requirement may be augmented by catalyst constituents that permit adsorbed oxygen atoms to move more freely to and from the reaction site.

The third requirement is that the catalyst display long lifetime towards exposure to exhaust gas constituents. Specifically, this requirement will be effected by the incorporation of catalyst constituents imparting basicity and oxygen mobility to the catalyst. The basicity enhances the removal of hydrogen from hydrocarbons and promotes incorporation of oxygen into the hydrocarbon fragments while preventing carbon deposition. The oxygen mobility prevents the blockage of catalyst sites by adsorbed oxygen. The active catalyst site must also allow for adsorbed pollutant fragments to have sufficient mobility over the catalyst surface to allow the reaction to proceed. For example, oxygen must possess sufficient mobility to interact chemically with adsorbed CO or hydrocarbons.

The fourth requirement is that a component be present that allows for excess oxygen to be taken up from the active site during periods of the engine cycle in which oxygen is present in excess in the exhaust gases, followed by its release during periods of the engine cycle in which oxygen is at relatively low levels, as occurs in engine exhausts due to varying levels of reducing agents (carbon monoxide or hydrocarbons) in the exhaust stream.

The fifth requirement is that the catalyst possess thermal and chemical stability under normal operating conditions.

The sixth requirement of the catalyst is that its rendering into operating form be simple, rapid, and inexpensive.

The above chemical requirements can be met by use of transition metals (Groups IIIB–IB) for the catalytically active component, in conjunction with lanthanides or actinides, and elements from the right hand side of the Periodic Table of the Elements (post transition elements from Groups IIIA–VIA). A catalyst capable of achieving mitigation of hydrocarbons, carbon monoxide, and nitrogen oxide would contain a platinum group (i.e. Pt, Pd, Ir, Rh, Os, or Ru) metal or first row transition metals (Cu, Co, Mn, Cr, or V) and lanthanum group oxides such as lanthanum oxide and cerium oxide. Of particular relevance to the present invention are palladium and copper catalysts utilizing lanthanum oxide and cerium oxide. Simple mixtures or sequential deposits of individual component oxides or metals do not allow for the possibility of the enhancement of redox (oxidation-reduction) behavior, stability, and oxygen or hydrogen transport that is attainable in particular doped binary or ternary materials disclosed in the present invention.

Previously used approaches employed sequential deposition of a washcoat of rare earth elements onto ceramic supports by dipping in a solution or slurry of salts of these species or by spraying a solution of these salts onto a monolith, followed by firing of the washcoat and subsequent deposition and reduction of a solution of a complex of the precious metal (Pt, Rh, Pd, or Ir). These approaches obviously lead to higher catalytic converter manufacturing costs when compared with the present approach. Additionally, there are necessarily separate phases of catalyst and support (alumina) as well as separate phases arising from washcoats, potentially leading to lower catalytic performance than is expected from the catalysts of the present invention.

In the present approach, a single-phase oxygen-deficient metal oxide material containing the catalytically active component is formed from a mixture of the constituent metal ions. This approach has the advantages of lower manufacturing costs as well as the enhanced catalysis resulting from the formation of single-crystallographic-phase catalysts.

In U.S. Pat. No. 5,234,881 to Narula et al, lanthanum and palladium are combined in the stoichiometry $La_2Pd_2O_5$ or La$_4$PdO$_7$ and supported on a substrate. However, no provision is made for the fourth requirement above: that is, a component such as Ce$^{4+}$ is not available. Additionally, the amount of palladium must, by the nature of that invention, be present in a stoichiometric ratio relative to the lanthanum component. This is in contrast to the present invention in which the transition metal (catalytically active component) is not necessarily present as a major stoichiometric component and, in fact, may be present to any fraction of the total weight of the catalyst, resulting in lower overall cost when the precious metal (e.g. Pd) fraction is reduced. Additionally, the present invention may incorporate less expensive catalysts than Pd, such as Cu, Ni, or other transition metals.

Also related to the subject matter of the present invention in respect to components used in catalyst preparation are U.S. Pat. Nos. 4,791,091; 4,868,149; 4,919,902; and 4,960,574 which describe a cerium oxide, lanthanum oxide, palladium oxide, and rhodium metal catalyst dispersed on an alumina coating on a honeycomb carrier. It was disclosed in U.S. Pat. Nos. 4,868,149 and 4,960,574, both to Bricker, that lanthanum replaces at least 3% of the cerium in the cerium oxide lattice. Additionally, U.S. Pat. Nos. 4,791,091 and 4,919,902, both to Bricker, disclosed an approach where the lanthanum oxide component was dispersed onto an alumina powder by suspending the alumina in a solution of a salt of lanthanum, followed by calcination. However, the catalyst preparation of those patents involves sequential deposition of components on a supporting structure, whereas in the present invention the carrier and active site are simultaneously formed and a characteristic crystallographic structure is obtained through the preparation, thus gaining an advantage in meeting the sixth requirement above. The formation of a crystallographically well-defined oxygen deficient phase as in the present invention allows for enhanced oxygen ion transport and oxygen uptake by oxidizable components, leading to superior characteristics in the third through the sixth requirements above.

Binary oxide catalysts possessing the general formulas A$_x$M$_y$O$_z$ (where A is an alkali metal, alkaline earth, rare earth, first row transition metal, or Y or Zr; and M is a metal from the group Ir, Rh, Pt, Pd, and Ru) were disclosed in U.S. Pat. No. 4,127,510 to Harrison et al. as achieving catalytic activity for three-way catalytic removal of exhaust pollutants. However, that invention is distinct from the present invention in that the metal M is only derivable from the group Ir, Rh, Pt, Pd, and Ru, and only forms compound oxides when the precious metal M is present in a stoichiometric amount, thus requiring that a very large fraction of the catalyst (>10% by weight) is present as precious metal, in distinct contrast to the present invention where weight fractions of less than 2% of precious metals are expected to be required.

Another perovskite-based catalyst is that documented in U.S. Pat. No. 5,015,616 to Sekido, et al. However, the Sekido catalyst does not possess the activity for use in catalytic removal of pollutants that is competitive with current approaches, lacking the active platinum group metals or copper as active site constituents. Perovskite materials do not intrinsically involve oxygen deficiencies, as do the materials of the present invention which are oxygen deficient by their nature. Due to its intrinsic oxygen ion vacancies, the present invention possesses enhanced oxygen ion mobility leading to greater catalytic activity.

A multifunctional catalyst that is formed by sequential or simultaneous deposition of cerium oxide, uranium oxide, rare earth oxide, and active metal (i.e Pt, Pd, Ir, Rh, Ru, Ag, or Au) is described in U.S. Pat. No. 5,108,978 to Durand, et al.

This approach differs from the present invention in that a single distinct catalyst crystallographic phase was not prepared, resulting in requirements 2–6 above not being met to the same extent as with the present invention.

Other modifications of the platinum group metal/redox resistant rare earth oxide/oxidizable-reducible rare earth oxide catalysts are documented in U.S. Pat. Nos. 4,587,231; 4,760,044; 4,923,842; 5,041,407; 5,116,800; and 5,248,650. None of these inventions involve the intentional formation of structurally well-defined catalyst compounds (catalyst properties depend on catalyst structure).

Literature related to ceria-based washcoat catalysts include articles concerning Pd—La$_2$O$_3$/Al$_2$O$_3$ (H. Muraki, H. Shinjoh, H. Sobukawa, K. Yokota, and Y. Fujitani, Ind. Eng. Chem. Prod. Res. Dev., 25, 202(1986)), Al$_2$O$_3$ and CeO$_2$/Al$_2$O$_3$ supported palladium and palladium-platinum catalysts (K. M Adams and H. S. Gandhi, SAE Paper No. 930084), WO$_3$ modified Pd supported on Al$_2$O$_3$ (Ind. Eng. Chem. Prod. Res. Dev., 22, 207(1983)), and CuO and Cr$_2$O$_3$ utilizing CeO$_2$ washcoats. The latter (CuO and Cr$_2$O$_3$) catalysts demonstrated poor activity toward nitrogen oxide decomposition and were generally intolerant towards sulfur in the exhaust stream: copper and chromium-based catalysts are well-known to have much less catalytic activity as compared to platinum-based catalysts. The poor activity problem is anticipated to be absent with the present invention because of the possibility of incorporating the aforementioned catalyst components or more active catalytic components (e.g. Pd, Pt, Ir, or Rh) into the single phase materials of the present invention possessing attributes such as superior oxygen mobility anticipated to enhance catalytic activity. The sulfur intolerance problem may be minimized by use of active catalyst sites forming relatively weak bonds with sulfur such as the platinum group metals Pt, Pd, Ir, and Rh.

DISCLOSURE OF THE INVENTION

In accordance with the present invention, a solid catalyst for decomposition of exhaust gases is provided. The catalyst comprises a single crystallographic phase material fabricated from a defect fluorite compound having general stoichiometry A$_{1-y}$A'$_{y-(1-x)}$B$_x$MO$_{2-\Delta}$ wherein: $0 \leq y \leq 1$, $0 \leq x \leq 1$ and $\Delta$ is a number which renders the compound charge neutral the A element is taken from the group consisting of lanthanides, actinides, and Group IV metals; the A' element is taken from the group consisting of 3+ lanthanide ions or other 3+ ions including Ga$^{3+}$, In$^{3+}$, Sb$^{3+}$, Bi$^{3+}$, Y$^{3+}$, or Sc$^{3+}$; the B element is taken from the group consisting of 2+ metal ions including Pb$^{2+}$, Sn$^{2+}$, Cu$^{2+}$, Ba$^{2+}$, Sr$^{2+}$, or Ca$^{2+}$; and the M element is a metal or metal ion taken from the group consisting of V, Cr. Mn, Fe, Ni, Ag, Au, Co, Cu, Pd, Pt, Re, Ru, Rh, Os, or Ir and comprises the catalytically active component.

A similar solid catalyst for exhaust decomposition may also be provided, comprising a single-crystallographic-phase material fabricated from a compound having general stoichiometry A$_2$B$_2$MO$_7$, wherein: the A element is taken from the group consisting of lanthanides, actinides, and Group IV metals; the B element is taken from the group consisting of 3+ lanthanide ions or other 3+ ions including Ga$^{3+}$, In$^{3+}$, Sb$^{3+}$, Bi$^{3+}$, Y$^{3+}$, or Sc$^{3+}$; and the M element is a metal ion taken from the group consisting of V, Cr, Mn, Fe, Ni, Ag, Au, Co, Cu, Pd, Pt, Re, Ru, Rh, Os, or Ir and comprises the catalytically active component.

Another solid catalyst for removal of exhaust gas constituents of A$_{1-x}$A'$_x$B$_{1-y}$B'$_y$MO$_{3-\Delta}$ comprising a single crystallographic-phase material having general stoichiometry $A_{1-x}A'_xB_{1-y}B'_yMO_{3-\Delta}$, wherein: $0 \leq x \leq 1$, $0 \leq y \leq 1$ and $\Delta$ is a number that renders the material charge neutral A is $Bi^{3+}$ or $Sb^{3+}$; A' is taken from the group consisting of $Pb^{2+}$, $Sn^{2+}$, $Cu^{2+}$, $Ba^{2+}$, $Sr^{2+}$, or $Ca^{2+}$; B is taken from the group consisting of $Co^{3+}$, $Fe^{3+}$, $Mn^{3+}$, $Ni^{3+}$, $Cr^{3+}$, or $V^{3+}$; B' is taken from the group consisting of $Cu^{2+}$, $Ni^{2+}$, $Fe^{2+}$, or $Co^{2+}$; and M is taken from the group consisting of Cu, Ag, Au, Pd, Pt, Re, Ru, Rh, Os, or Ir.

A catalytic reactor for decomposition of exhaust gases may further be provided, utilizing any of the catalysts of the present invention. The reactor comprises a catalyst film adhering to the inner surfaces of a metal or ceramic honeycomb matrix and prepared according to any one of claims 1 through 5, and having an entrance port, an exit port, and a passage therebetween for the movement of gases from the entrance port to the exit port; or a powder or pellets of the catalysts contained in a metal casing with an entrance port, an exit port, and a passage therebetween for the movement of gases from the entrance port to the exit port.

In summary, the present invention possesses the advantages of 1) a synthesis procedure leading to the simultaneous formation of the catalytically active component and the surrounding metal oxide lattice, resulting in lower manufacturing cost; 2) higher intrinsic activity than simple mixtures of components or sequentially deposited components; and 3) greater stability and lifetime of catalysts.

Additional advantages of this invention will become apparent from the description which follows, taken in conjunction with the accompanying drawings.

BRIEF DESCRIPTION OF THE DRAWINGS

FIG. 3 shows a catalytic reactor or converter incorporating the catalysts of the present invention.

BEST MODE FOR CARRYING OUT THE INVENTION

Figure 1:
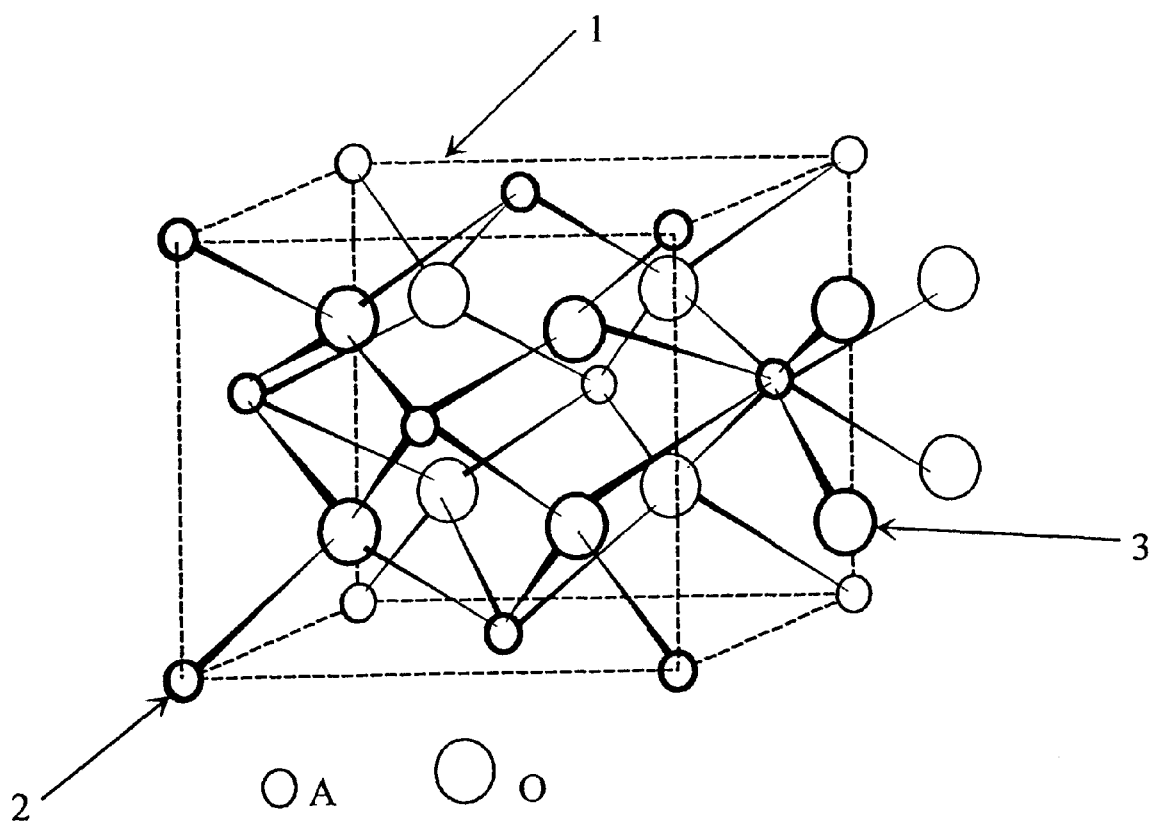
FIG. 1 depicts an $AO_2$ (where, e.g. A is $Ce^{4+}$) unit cell possessing the fluorite structure from which the present invention is derived.
Figure 2:
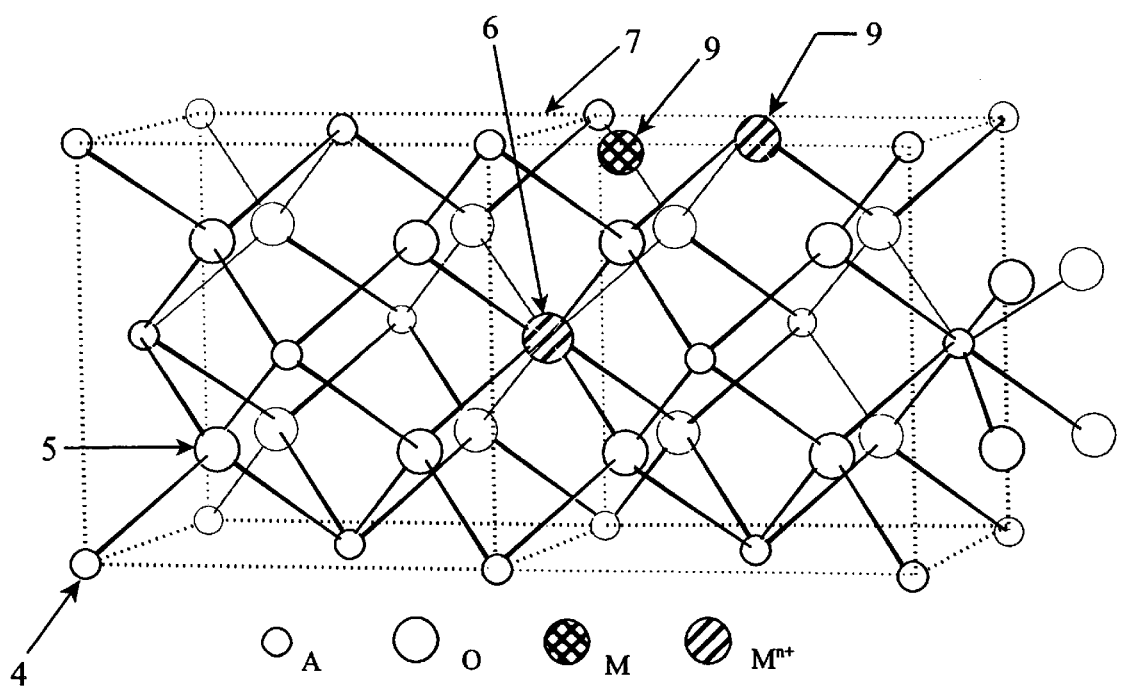
FIG. 2 shows a schematic representation of the fluorite-derived crystallographic structure of the present invention.

The catalysts of this invention are derivatives of the fluorite structure possessing the stoichiometry $AO_2$ (e.g. $CeO_2$) shown in FIG. 1. This structure 1 includes A cations 2 with eight nearest-neighbor O atoms 3. The present invention, schematically represented in FIG. 2, consists of the fluorite structure with parent metal A (e.g. cerium) ions, 4, at its faces and corners and connected to eight oxygen ions, 5, modified by substitution of the parent metal A (e.g. cerium) ions by other metal ions, including the catalytically active component 6. The catalytically active component may predominantly occur at the surface 7 as an ion 8 replacing parent metal ion or as a metal atom 9 or cluster of atoms at the surface.

The removal of common exhaust pollutants (i.e. CO, hydrocarbons, nitrogen oxides, and sulfur oxides) using catalysts with the active (transition metal) site co-formed with a compound oxide carrier (support or surrounding structure) possessing bulk and surface oxygen ion mobility greater than that of a mixture of the component oxides can lead to significantly enhanced catalytic activity. This enhanced catalytic activity is due to several causes: 1) the rate of oxygen transport between reaction (catalytically active) site and oxygen storage components (e.g. $Ce^{4+}$) are accelerated, leading to enhanced hydrocarbon oxidation activity; 2) a well-defined geometric arrangement of charged species (i.e. oxygen ions or metal cations) is made available, leading to preferable catalytic site electronic configuration and consequently, more optimal pollutant molecule binding to the catalyst surface and more optimal catalytic activity; 3) defects incorporating reaction intermediates (i.e. components of pollutant molecules such oxygen from nitrogen oxides) are made available leading to enhanced decomposition of pollutant molecules; 4) the active component is incorporated into a crystallographic motif (structure) which prefers a particular chemical state (i.e. oxidation or geometric) of the active site; 5) the reaction demonstrates a preference for the carrier (defect fluorite or pyrochlore) structure because the geometric arrangement of catalyst and carrier surface atoms may accelerate reactions such as hydrocarbon decomposition; 6) the basicity of the catalyst (its capacity to remove hydrogen from hydrocarbons as $H^+$ or to donate an electron pair on oxygen ions) is altered by use of the carrier structure, enabling the catalyst to more efficiently decompose and oxidize hydrocarbons; and 7) active site (catalyst metal) redox properties (i.e. oxidizability or reducibility) are enhanced. The catalytic specie(s) may be a metal ion incorporated into the carrier lattice or may be a metal atom, cluster, or ion bound onto the surface of the carrier, and it may possess crystallographic registry with the carrier surface or be crystallographically independent of the carrier surface. Specific carrier structures will include defect fluorite and pyrochlore structures, but also other structures possessing the same stoichiometric ratios of components as these. The catalysts may be in the form of unsupported powders, films supported on a solid structure including dense ceramic or metal membranes semipermeable to reaction products (i.e., permeable to some reaction products, such as $H_2$ or $O_2$, but impermeable to others) or an impermeable solid ceramic or metal support. Specific reactions will include the chemical and reductive decomposition of nitrogen oxides, the oxidation of carbon monoxide, and the oxidation of hydrocarbons separately or simultaneously when these reactions occur in the exhausts of automobiles or exhausts of other machines or devices. The exhausts may or may not contain oxygen or air.

The simultaneous (three way) decomposition of common automobile exhaust pollutants ((1) nitrous oxides; (2) carbon monoxide; and (3) hydrocarbons) requires several catalyst attributes: 1) site(s) for adsorption of nitrogen oxide, 2) sites for CO adsorption, 3) catalyst acidity or basicity for hydrocarbon adsorption or dehydrogenation, 4) ability to weaken N—O bonds, 5) ability to utilize adsorbed oxygen to oxidize adsorbed CO, and 6) ability to dehydrogenate adsorbed hydrocarbon and oxidize the adsorbed, dehydrogenated fragment. Conventional catalysts possess several separable components. The first is the active (metal) site. The second is a site that allows for the incorporation of oxygen during periods of relatively lean (oxygen rich) performance for use during periods of relatively fuel rich performance. The third component typically imparts stability, basicity, and oxygen mobility to the catalyst and influences the absorbability of reactions. The present invention incorporates all these aspects into a single identifiable compound.

The materials of the present invention are structurally derived from compounds such as $AO_2$ (where A is a species possessing a +4 oxidation state, for example, Ce, Pr, Tb, Th, or U) which possess the fluorite structure shown in FIG. 1. However, addition of a rare earth oxide or other oxide possessing the formula $B_2O_3$ results in substitution of $A^{4+}$ by $B^{3+}$ and a deficiency of anions (oxygen ions) or increase in oxygen ion vacancies to compensate for the reduced positive charge of the $B^{3+}$ cation. The resulting compounds are known as defect fluorite structures, which correspond to the parent fluorite structure with a fraction of the oxygen ions removed, and, consequently, produce x-ray diffraction patterns similar to the parent fluorite structure. If a one-eighth fraction of the oxygen ions are removed by doping one mole of the parent $AO_2$ compound with one-half mole of $B_2O_3$, a pyrochlore structure can result.

A specific example of a catalyst material possessing the aforementioned attributes is the material with the stoichiometry $Ce_{0.5}La_{0.4}Sr_{0.1}Pd_{0.025}O_{2-\Delta}$ where $\Delta$ has a value that renders the compound charge neutral. This compound is formed when a mixture of the components $CeO_2$, $La_2O_3$, SrO, and Pd is subjected to temperatures above 1200° C. The resulting material exhibits a fluorite-type structure and contains oxygen vacancies because of the incorporation of the lower valency species $La^{3+}$ and $Sr^{2+}$ into the lattice. This is clearly different from a mixture of the components, since a deficiency of oxygen ions in the bulk of the compound results, while a simple mixture does not intrinsically possess such defects. This oxygen ion deficiency has the effect of promoting motion of oxygen ions and of accelerating oxidation reactions occurring at the active metal (e.g. Pd) site by interaction between surface vacancy and an oxygen containing species (e.g. NO) may result in the accelerated decomposition of the oxygen containing species because of weakening of the N—O bond. Another example is the material possessing the stoichiometry $BiCo_{0.8}Cu_{0.2}O_{3-\Delta}$ which possesses an oxygen deficient $\delta$-$Bi_2O_3$ structure which is a cubic defect fluorite-type structure. This catalyst was prepared by heating to combustion an aqueous solution of Bi, Co, and Cu nitrates and glycine. A very fine powder resulted, which was subsequently calcined at 600° C. 0.25 g of the catalyst gave 30% decomposition of NO at 500° C. using a mass gas hourly space velocity of 2500 $h^{-1}$ and concentrations of 2650 ppm NO and 3700 ppm CO.

Catalysts may have a variety of forms. For example, $Ce_{0.5}La_{0.4}Sr_{0.1}Pd_{0.025}O_{2-\Delta}$ is of the general form $A_{1-y}A'_{y-(1-x)}B_xMO_{2-\Delta}$, where A is a lanthanide ($Ce^{4+}$, $Pr^{4+}$, $Tb^{4+}$) an actinide ($U^{4+}$ or $Th^{4+}$) or group IV metal ($Zr^{4+}$, $Hf^{4+}$); A' is a 3+ lanthanide ion ($La^{3+}$, $Nd^{3+}$, $Sm^{3+}$, $Eu^{3+}$, $Gd^{3+}$, $Dy^{3+}$, or $Yb^{3+}$) or another 3+ ion ($Ga^{3+}$, $In^{3+}$, $Sb^{3+}$, $Bi^{3+}$, $Y^{3+}$, or $Sc^{3+}$); B is a 2+ metal ion ($Pb^{2+}$, $Sn^{2+}$, $Cu^{2+}$, $Ba^{2+}$, $Sr^{2+}$, or $Ca^{2+}$); and M is the active site metal or metal ion (Co, Cu, Pd, Pt, Re, Ru, Rh, Os, or Ir). The compound, may also possess the form of a pyrochlore with stoichiometry $A_2B_2MO_7$. M may also be a metal (e.g. Ag, Au, Pd, Pt, Rh, or Ir) which does not have affinity for the lattice, but which migrates to its surface. Other stoichiometries of the form $Ln_{1-x}A_xBMO_{3-\Delta}$ are also possible. For example, $Ce_{1-x}Sr_xCr_{1-y}Cu_yO_{3-\Delta}$ is one such compound.

Of great importance to the present invention is the method of preparation. In the present invention, the catalyst (metal M) site is simultaneously incorporated into the surrounding metal oxide lattice during the preparation of the material. This allows for the employment of preparation methods such as coprecipitation of the metal oxide lattice with active site or precipitation-deposition upon a supporting structure. The use of an active component with weak binding to oxygen allows the metal to migrate to the metal oxide surface during calcination, resulting in the formation of small metal clusters possessing anomalous physical and chemical properties.

The catalysts of the present invention may be synthesized in a number of ways. In the first, a powder of the catalyst is prepared from the corresponding oxides or carbonates of the catalyst components. The powders are ball milled for several hours, followed by calcining at, for example, between 1000 and 1400° C. for several hours for materials of the general formula $A_{1-y}A'_{y-(1-x)}B_xMO_{2-\Delta}$ and between 600 and 850° C. for materials of the general formula $A_{1-x}A'_xB_{1-y}B'_yMO_{3-\Delta}$. A second method of preparing catalyst powders involves coprecipitation of the components of the catalyst. In this approach, a precipitating reagent (e.g. $Na_2CO_3$ or $K_2CO_3$, NaOH or KOH, or sodium or potassium oxalate) is added to a solution of nitrates or other soluble forms of the components of the catalyst. A precipitate forms which consists of extremely fine particles of sizes ranging from 100 Å to several microns. The individual components are distributed in much smaller regions than is possible starting from mixtures of powders. The resulting precipitate is filtered and washed with water, followed by calcining at between 200 and 900° C.

The catalysts may also be synthesized as films on solid supporting structures such as metal or ceramic monoliths, solid electrolytes, or dense (>90% of theoretical density) ceramic or metal membranes semipermeable to decomposition products such as $O_2$. Here, the supporting structure is immersed into a solution of the component ions of the catalyst, or alternatively, this solution is sprayed onto the supporting structure. The support, with a dried film of the component metal salts, is calcined at temperatures similar to those for powder preparation.

SPECIFIC EXAMPLE OF INVENTION

A catalyst possessing the stoichiometry $Ce_{0.5}La_{0.4}Sr_{0.1}Pd_{0.025}O_{2-\Delta}$ was synthesized from the carbonates $Ce_2(CO_3)_3$, $La_2(CO_3)_3$, and $SrCO_3$ and the nitrate $Pd(NO_3)_2$ by ball milling and calcining the mixtures. At a calcination temperature of 900° C. a mixture of crystallographic phases was obtained. At 500° C., 0.25 g of this catalyst packed into a quartz tube reactor decomposed 80% of the NO in a stream containing 2650 ppm NO, 3700 ppm CO, and 7500 ppm $C_3H_8$, with feed rates corresponding to 7500 $h^{-1}$ (mass gas hourly space velocity). Calcining the material at 1200° C. produced a single phase material giving rise to an X-ray diffraction pattern characteristic of a fluorite or defect fluorite structure. Operation of 0.25 g of the catalyst under the previously described conditions resulted in 100% decomposition. Use of the same feed rates but concentrations of 75 ppm NO, 105 ppm CO, and 215 ppm $C_3H_8$ again resulted in 100% removal of NO. By way of comparison at 500° C., 0.25 g of 0.2% Pt/0.02% Rh on $Al_2O_3$ gave 80% conversion at the higher concentrations of reactants, but at a flow rate of only one-third of that utilized for the subject of the present invention. This equates to a cost based activity for the present invention of approximately 1.4 times that of the Pt/Rh catalyst.

A catalytic converter utilizing a ceramic or metal (e.g. stainless steel) monolith (honeycomb matrix) is schematically represented in FIG. 3. The reactor includes an external casing 10 (generally a metal) with inlet 12 and exit 13 for exhaust gases. The catalysts of the present invention are incorporated onto the ceramic or metal monolith (honeycomb matrix) 11 and form adherent films 14 on the walls 15 of the monolith channels. The exhaust gas entering 12 impinges on the catalyst on the walls of the channels of the monolith, reacts, and is discharged with lower pollutant (carbon monoxide, hydrocarbon, and nitrogen oxides) levels and increased levels of innocuous products of pollutant removal (carbon dioxide, water, and nitrogen).

We claim:

1. A solid catalyst for decomposition of exhaust gases comprising a single crystallographic phase material having the formula:

$$A_{1-y}A'_{y-(1-x)}B_xMO_{2-\Delta}$$

where $0 \leq y \leq 1$; $0 \leq x \leq 1$; $\Delta$ is a number that renders the composition charge neutral; A is selected from the group consisting of lanthanides, actinides, and group IV metals; A' is selected from the group consisting of group 3+ lanthanide metal ions $Ga^{3+}$, $In^{3+}$, $Sb^{3+}$, $Bi^{3+}$, $Y^{3+}$, and $Sc^{3+}$; B is a 2+metal ion selected from the group consisting of the metal ions $Pb^{2+}$, $Sn^{2+}$, $Cu^{2+}$, $Ba^{2+}$, $Sr^{2+}$, and $Ca^{2+}$; and M is a metal ion selected from the group consisting of the metal ions of V, Cr, Mn, Fe, Ni, Ag, Au, Co, Cu, Pd, Pt, Re, Ru, Rh, Os, or Ir.

2. A catalytic reactor for decomposition of exhaust gas pollutants which comprises:

a casing having an entrance port, an exit port and a passage therebetween for the movement of said gases from the entrance port to the exit port; and a catalyst according to claim 1 in said passage wherein said gases contact said catalyst before exiting said casing.

3. A catalytic reactor according to claim 2 further comprising:

a honeycomb matrix having inner and outer surfaces; and wherein said catalyst is a layer of catalyst on the inner surfaces of said honeycomb matrix and wherein said gases contact said inner surfaces.

4. A solid catalyst for decomposition of exhaust gases comprising a single crystallographic phase material having the formula:

$$A_2B_2MO_7$$

where:

A is selected from the group consisting of lanthanides and actinides;

B is selected from the group consisting of 3+ lanthanide metal ions and $Ga^{3+}$, $In^{3+}$, $Sb^{3+}$, $Bi^{3+}$, $y^{3+}$, and $Sc^{3+}$; and M is a metal ion selected from the group consisting of the metal ions of V, Cr, Mn, Fe, Ni, Ag, Au, Co, Cu, Pd, Pt, Re, Ru, Rh, Os, or Ir.

5. A catalytic reactor for decomposition of exhaust gas pollutants which comprises:

a casing having an entrance port, an exit port and a passage therebetween for the movement of said gases from the entrance port to the exit port; and a catalyst according to claim 4 in said passage wherein said gases contact said catalyst before exiting said casing.

6. A solid catalyst for decomposition of exhaust gases comprising a single crystallographic phase material having the formula:

$$A_{1-x}A'_xB_{1-y}B'_yMO_{3-\Delta}$$

where $0 \leq y \leq 1$; $0 \leq x < 1$; $\Delta$ is a number that renders the composition charge neutral; A is $Bi^{3+}$ or $Sb^{3+}$; A' is selected from the group consisting of $Pb^{2+}$, $Sn^{2+}$, $Cu^{2+}$, $Ba^{2+}$, Sr+, or $Ca^{2+}$; B is $Co^{3+}$, $Fe^{3+}$, $Mn^{3+}$, $Ni^{3+}$, $Cr^{3+}$, or $V^{3+}$; B' is selected from the group consisting of $Cu^{2+}$, $Ni^{2+}$, $Fe^{2+}$, and $Co^{2+}$; and M is selected from the group consisting of Cu, Ag, Au, Pd, Pt, Re, Ru, Rh, Os or Ir.

7. A catalytic reactor for decomposition of exhaust gas pollutants which comprises:

a casing having an entrance port, an exit port and a passage therebetween for the movement of said gases from the entrance port to the exit port; and a catalyst according to claim 6 in said passage wherein said gases contact said catalyst before exiting said casing.

8. A solid catalyst for decomposition of exhaust gases comprising a single crystallographic phase material having the formula $Ce_{0.5}La_{0.4}Sr_{0.1}Pd_{0.025}O_{2-x}$.

9. A catalytic reactor for decomposition of exhaust gas pollutants which comprises:

a casing having an entrance port, an exit port and a passage therebetween for the movement of said gases from the entrance port to the exit port; and a catalyst according to claim 8 in said passage wherein said gases contact said catalyst before exiting said casing.

10. A solid catalyst for decomposition of exhaust gases comprising a single crystallographic phase material having the formula $BiCo_{0.8}Cu_{0.2}O_{3-x}$.

11. A catalytic reactor for decomposition of exhaust gas pollutants which comprises:

a casing having an entrance port, an exit port and a passage therebetween for the movement of said gases from the entrance port to the exit port; and a catalyst according to claim 10 in said passage wherein said gases contact said catalyst before exiting said casing.

12. A method for synthesizing a catalyst for decomposition of exhaust gas pollutants which comprises the steps of:

(A) providing a compound selected from the group consisting of $AO_2$ and $A(CO_3)_2$ wherein the A element is selected from the group consisting of 4+ ions of the lanthanides, actinides and Group IV metals;

(B) providing the compound $A'_2O_3$, where the A' element is selected from the group consisting of the 3+ ions, $La^{3+}$, $Ga^{3+}$, $In^{3+}$, $Sb^{3+}$, $Bi^{3+}$, $y^{3+}$, and $Sc^{3+}$;

(C) providing a compound selected from the group consisting of BO and $BCO_3$ where the B element is selected from the group consisting of the 2+ metal ions, $Pb^{2+}$, $Sn^{2+}$, $Cu^{2+}$, $Ba^{2+}$, $Sr^{2+}$, and $Ca^{2+}$;

(D) providing a compound selected from the group consisting of $M_2O$, MO, $M_2O_3$, $MO_2$, $MNO_3$, $M(NO_3)_2$, $M(NO_3)_3$, and $M(NO_3)_4$ where M is a metal ion taken from the group consisting of the metal ions of V, Cr, Mn, Fe, Ni, Ag, Au, Co, Cu, Pd, Pt, Re, Ru, Rh, Os, and Ir;

(E) mixing quantities of the compounds of steps (A) through (D) together so that the stoichiometric ratio of A/A' is 1.25, the stoichiometric ratio of A/B is 5 and the weight fraction of M in the mixture is less than 2%;

(F) ball milling the mixture of step (E) to form a powder; and (G) calcining said powder at a temperature between 1000° C. and 1400° C.

13. The method of claim 12 wherein the mixture is calcined at temperatures above 1200° C.

14. The method of claim 12 wherein the compound of step (D) is combined with the compounds of steps (A)–(C) in the stoichiometric ratio of A/M is 20.

15. The method of claim 12 wherein the compound of step D is $Pd(NO_3)_2$ and wherein the compound of step (D) is combined with the compounds of steps (A)–(C) in the stoichiometric ratio of A/Pd is 20.

16. The method of claim 14 wherein A is $Ce^{4+}$, A' is $La^{3+}$, B is $Sr^{2+}$ and M is $Pd^{2+}$.

17. The method of claim 12 wherein said catalyst is a catalyst for removal of nitrogen oxides from exhaust gas.

18. The catalyst prepared by the method of claim 12.

19. A method for synthesizing a catalyst for decomposition of exhaust gas pollutants which comprises the steps of:

(A) providing a compound selected from the group consisting of $AO_2$ and $A(CO_3)_2$ wherein A is selected from the group consisting of $Bi^{3+}$ and $Sb^{3+}$;

(B) providing the compound BO and $BCO_3$, where B is selected from the group consisting of $Co^{3+}$, $Fe^{3+}$, $Mn^{3+}$, $Ni^{3+}$, $Cr^{3+}$, and $V^{3+}$;

(C) providing a compound selected from the group consisting of B'O and B' $CO_3$ where B is selected from the group consisting of $Cu^{2+}$, $Ni^{2+}$, $Fe^{2+}$, and $Co^{2+}$;

(D) providing a compound selected from the group consisting of $M_2O$, MO, $M_2O_3$, $MO_2$, $MNO_3$, $M(NO_3)_2$, $M(NO_3)_3$, and $M(NO_3)_4$ where M is a metal ion selected from the group consisting of the metal ions of Ag, Au, Cu, Pd, Pt, Re, Ru, Rh, Os, and Ir;

(E) mixing quantities of the compounds of steps (A) through (D) together so that the stoichiometric ratio of the weight fraction of M in the mixture is less than 2%, the stoichiometric ratio of A/B is 1.25 and the stoichiometric ratio of A/(B'+M) is 5;

(F) ball milling the mixture of step (E) to form a powder; and (G) calcining said powder at a temperature between 600° C. and 850° C.

20. The method of claim 19 wherein A is $Bi^{3+}$, B is $Co^{3+}$, B' is $Cu^{2+}$ and M is a metal ion of Cu.

21. The method of claim 19 wherein said catalyst is a catalyst for removal of nitrogen oxides from exhaust gas.

22. A catalyst prepared by the method of claim 19.

23. A method for synthesizing a catalyst for the decomposition of exhaust gas pollutants which comprises the steps of:

(A) providing a compound $A(NO_3)_3$, where A is selected from the group consisting of 4+ ions of the lanthanides, actinides and Group IV metals;

(B) providing a compound $A'(NO_3)_3$, where A' is selected from the group consisting of the 3+ ions, $La^{3+}$, $Ga^{3+}$, $In^{3+}$, $Sb^{3+}$, $Bi^{3+}$, $y^{3+}$, and $Sc^{3+}$;

(C) providing a compound $B(NO_3)_2$, where B is selected from the group consisting of the 2+ metal ions, $Pb^{2+}$, $Sn^{2+}$, $Cu^{2+}$, $Ba^{2+}$, $Sr^{2+}$, and $Ca^{2+}$;

(D) providing a compound $MNO_3$, $M(NO_3)_2$, $M(NO_3)_3$, and $M(NO_3)_4$ which is a soluble nitrate where M is a metal ion selected from the group of metal ions of V, Cr, Mn, Fe, Ni, Cu, Ag, Au, Pd, Pt, Re, Ru, Rh, Os, and Ir;

(E) dissolving quantities of the compounds of steps (A)–(D) in water to form a solution wherein the stoichiometric ratio of A/A' is 1.25, the stoichiometric ratio of A/B is 5 and the weight fraction of M in the mixture is less than 2%;

(F) adding to the solution of step (E) a sufficient amount of a precipitation agent selected from the group consisting of $Na_2CO_3$, $K_2CO_3$, NaOH, KOH, sodium oxalate, and potassium oxalate to form a precipitate of the compounds of steps (A)–(D);

(G) collecting the resulting precipitate of step (F);

(H) washing the collected precipitate of step (G) to remove excess precipitating agent; and (I) calcining the washed precipitate of step (H) at a temperature between 200° C. and 600° C.

24. The method of claim 23 wherein the stoichiometric ratio of A/M in said mixture is 20.

25. A method for synthesizing a catalyst for the decomposition of exhaust gas pollutants which comprises the steps of:

(A) providing a compound $A(NO_3)_3$, where A is selected from the group consisting of $Sb^{3+}$ and $Bi^{3+}$;

(B) providing a compound $B(NO_3)_3$, where B is selected from the group consisting of $Co^{3+}$, $Fe^{3+}$, $Mn^{3+}$, $Ni^{3+}$, $Cr^{3+}$, and $V^{3+}$;

(C) providing a compound B' $(NO_3)_2$, where B' is selected from the group consisting of $Cu^{2+}$, $Ni^{2+}$, $Fe^{2+}$, and $Co^{2+}$;

(D) providing a compound $MNO_3$, $M(NO_3)_2$, $M(NO_3)_3$, and $M(NO_3)_4$ which is a soluble nitrate where M is a metal ion selected from the group of metal ions of Cu, Ag, Au, Pd, Pt Re, Ru, Rh, Os, and Ir;

(E) dissolving quantities of the compounds of steps (A)–(D) in water to form a solution wherein the fractional weight ratio of M to the total weight of dissolved compounds is less than 2%, the stoichiometric ratio of A/B is 1.25, and the stoichiometric ratio of A/(B'+M) is 5;

(F) adding to the solution of step (E) a sufficient amount of a precipitation agent selected from the group consisting of $Na_2CO_3$, $K_2CO_3$, NAOH, KOH, sodium oxalate, and potassium oxalate to form a precipitate of the compounds of steps (A)–(D);

(G) collecting the resulting precipitate of step (F);

(H) washing the collected precipitate of step (G) to remove excess precipitating agent; and (I) calcining the washed precipitate of step (H) at a temperature between 200° C. and 600° C.

26. The method of claim 25 wherein A is $Bi^{3+}$, B is $Co^{3+}$, B' is $Cu^{2+}$ and M is a metal ion of Cu.

27. The method of claim 25 wherein said catalyst is a catalyst for removal of nitrogen oxides from exhaust gas.

28. The catalyst prepared by the method of claim 25.

* * * * *

UNITED STATES PATENT AND TRADEMARK OFFICE
CERTIFICATE OF CORRECTION

PATENT NO. : 5,925,590

DATED : Jul. 20, 1999

INVENTOR(S) : White et al.

It is certified that error appears in the above-identified patent and that said Letters Patent is hereby corrected as shown below:

At column 5, line 41, delete "FIG. 3" and replace with --FIG. 3A--.

At column 5, line 42, after " present invention.", insert --FIG. 3B is an expanded view of the ceramic or metal monolith (honeycomb matrix) of a catalytic reactor or converter.--.

At column 8, line 53, delete "FIG. 3" and replace with --FIG. 3A--.

At column 8, line 58, after "channels", insert --The structure of the ceramic or metal monolith is shown in expanded view in FIG. 3B.--

At [57], line 3 of the Abstract, delete " $Ce_{0.5}La_{0.4}Sr_{0.1}O_{3x}$ " and replace with -- $Ce_{0.5}La_{0.4}Sr_{0.1}O_{2-x}$ --.

At [57], line 4 of the abstract, delete " $BiCo_{0.8}Cu_{0.2}O_{3x}$ " and replace with -- $BiCo_{0.8}Cu_{0.2}O_{3-x}$ --.

In claim 4, column 9, line 37, delete " $y^{3+}$ " and replace with -- $Y^{3+}$ --.

In claim 6, column 9, line 56, delete " $0 \leq x < 1$ " and replace with -- $0 \leq x \leq 1$ --.

In claim 23, line 42, delete " $y^{3+}$ " and replace with -- $Y^{3+}$ --.

Signed and Sealed this

Eleventh Day of July, 2000

*Attest:*

Q. TODD DICKINSON

*Attesting Officer*     *Director of Patents and Trademarks*